United States Patent [19]

Duehring et al.

[11] Patent Number: 5,082,303
[45] Date of Patent: Jan. 21, 1992

[54] CHANGEABLE DROPOUT ASSEMBLY

[75] Inventors: William K. Duehring, Huntington Beach, Calif.; Forrest D. Yelverton, Longmont, Colo.

[73] Assignee: GT Bicycles, Inc. a Calif. Corporation, Huntington Beach, Calif.

[21] Appl. No.: 579,361

[22] Filed: Sep. 6, 1990

[51] Int. Cl.$^5$ .............................................. B62K 19/18
[52] U.S. Cl. ..................... 280/288; 280/284
[58] Field of Search ............. 280/288, 284, 281.1, 280/279, 276, 274

[56] References Cited

U.S. PATENT DOCUMENTS

| 534,680 | 2/1895 | Bolte | 280/288 X |
| 4,565,383 | 1/1986 | Isaac | 280/288 |
| 4,856,802 | 8/1989 | Schilplin | 280/288 |

FOREIGN PATENT DOCUMENTS

| 416555 | 8/1910 | France | 280/288 |
| 287439 | 4/1953 | Switzerland | 280/288 |

OTHER PUBLICATIONS

American, brochure, by American Bicycle Mfg. Corporation.

Primary Examiner—Kenneth R. Rice
Attorney, Agent, or Firm—Stetina and Brunda

[57] ABSTRACT

An improved vertical dropout assembly for attachment to a bicycle frame is disclosed which comprises an easily replaceable vertical dropout member and an interchangeable derailleur hanger system. The dropout member is configured to allow the adjustment of the rear wheel within the frame of the bicycle and to provide improved clearance between the frame and chain. The derailleur hanger system is operable to position any make of derailleur at its optimum location with respect to the rear wheel and is adapted to be easily replaced in the event of an accident.

8 Claims, 1 Drawing Sheet

U.S. Patent
Jan. 21, 1992
5,082,303
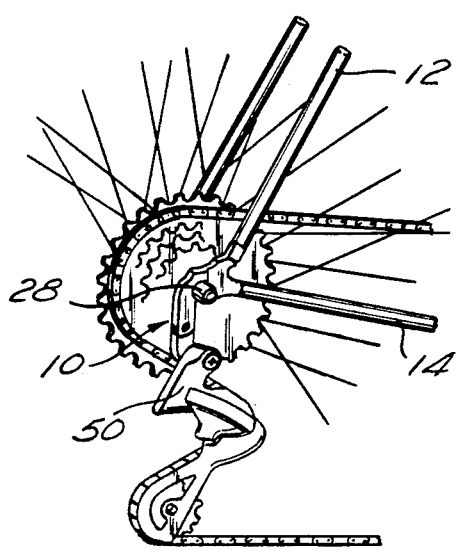
Fig. 1
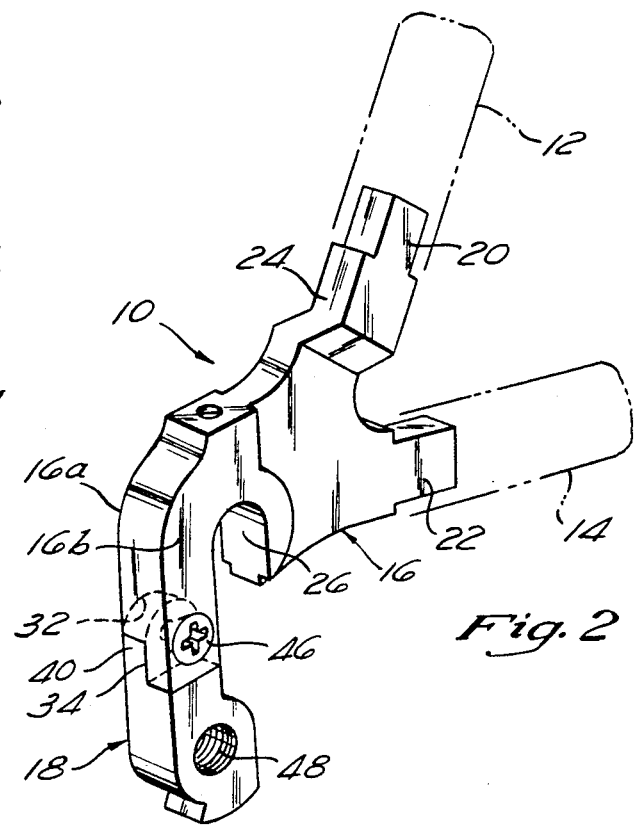
Fig. 2
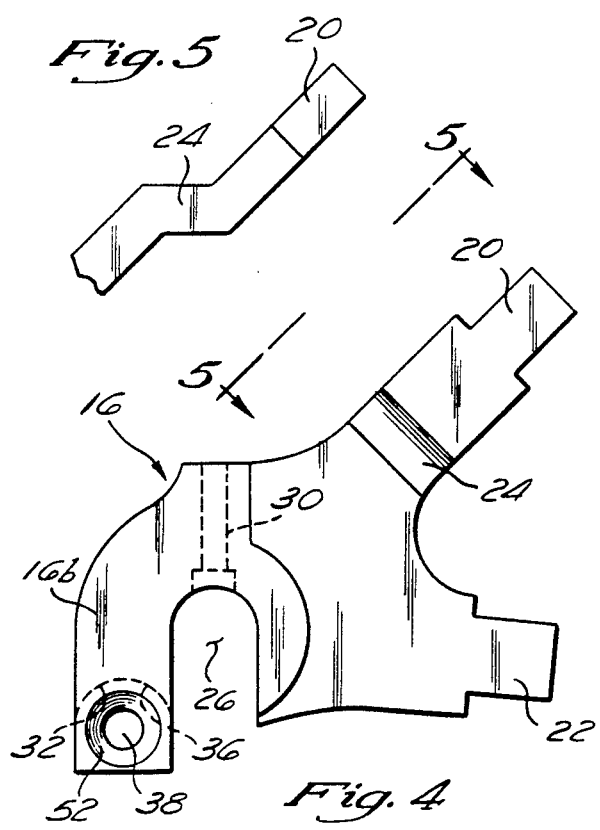
Fig. 5
Fig. 4
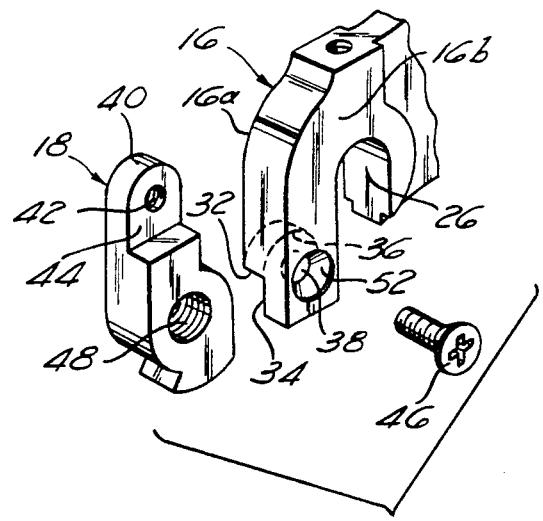
Fig. 3

CHANGEABLE DROPOUT ASSEMBLY

FIELD OF THE INVENTION

The present invention relates generally to bicycle components and more particularly to a rear dropout assembly for attachment to the frame of a bicycle.

BACKGROUND OF THE INVENTION

One of the principal components of currently known and manufactured bicycles is a component referred to as a "rear dropout". One of the primary functions of the rear dropout is to maintain and securely mount the axle of the rear wheel to the frame of the bicycle. In multiple speed (i.e. Gear) bicycles, the rear dropout further functions as a support structure wherein the rear derailleur of the bicycle is attached to a portion of the dropout referred to as the derailleur hanger. Currently, many types of rear dropout designs are known in the art. In this respect, the two most predominantly known design types are the "vertical" dropout and the "horizontal" or "slotted" dropout, both of which are named in reference to the direction the axle of the rear wheel is entered thereinto. With regard to vertical dropouts as currently known and manufactured, such dropouts generally have three major deficiencies associated with their designs.

The first deficiency relates to wheel alignment. A major function and advantage of using a vertical dropout, as opposed to a horizontal dropout, is the "self-centering" of the wheel within the frame of the bicycle achieved through the limitation of the rear axle movement in either a horizontal or vertical plane. However, as can be appreciated, any mis-alignment during factory installation of the dropout will cause the rear wheel to be out of its desired position with regard to the mechanical plane of the bicycle, thereby adversely affecting the bicycle's handling and braking characteristics. Currently known vertical dropouts contain no means for adjusting the axle of the rear wheel if such mis-alignment is to occur during manufacture or throughout the useful life of the bicycle.

The second deficiency relates to situations wherein the dropout is damaged. As previously specified, in multi-speed bicycles, one of the major components attached to the dropout is the rear derailleur which is used to selectively move the chain of the bicycle to various positions on the rear sprocket cluster. In certain instances, the derailleur is inadvertently entangled with some object while the bicycle is in motion, or is caught in the spokes of the moving rear wheel. When such occurs, invariably some damage will occur to the derailleur itself, the dropout, or both. In the worst case, the result is a broken and useless derailleur combined with a twisted and broken dropout, thus leaving the bicycle rider or user stranded and unable to easily repair the damage. The majority of presently known vertical dropouts are not configured so as to be easily removed and replaced when such damage occurs. In this respect, such dropouts are typically welded or soldered into the bicycle frame, thereby necessitating that the weld be broken to remove the damaged dropout and a replacement dropout be re-welded into place. As can be appreciated, such an operation must usually be conducted at a commerical repair establishment and generally involves a high cost.

The third deficiency associated with currently known vertical dropouts relates to derailleur positioning. Presently, there are no set standards for dropout dimensions with regard to the position of the derailleur hanger portion. With the advent of indexable shifting, it is imperative that when a derailleur and/or dropout is replaced, that the derailleur be positioned with respect to the axle of the rear wheel exactly as per the derailleur manufacturer's specifications. However, because no set dimensional standards exist, no currently known vertical dropout can position the multitude of differing available derailleurs in their required and/or optimum location.

Though a number of replaceable rear dropouts are known in the art, these dropouts are configured such that a relatively large portion of the dropout must be replaced if damaged, including the section which holds the rear wheel axle. In this regard, the large size and weight of the replaceable portion of these dropouts makes it unlikely that a rider will carry a spare replaceable portion. Additionally, the design of most of the presently known rear dropouts is such that a portion of the right seat stay (the portion of the frame that runs between the rear dropout and the upper portion of the frame near the seat) must be filed away or crimped to allow clearance for the bicycle chain when it is on the smallest freewheel cog of the sprocket cluster. This alteration of the seat stay has the disadvantage of creating a potentially weak point in the frame.

Thus, there exists a need in the art for a replaceable vertical dropout which alleviates the aforementioned three major problem areas associated with currently available vertical dropouts as well as the problems associated with currently available replaceable dropouts.

SUMMARY OF THE INVENTION

In accordance with a preferred embodiment of the present invention, there is provided a replaceable vertical dropout assembly for attachment to the frame of a bicycle. Advantageously, the vertical dropout assembly is configured to allow the adjustment of the rear wheel within the bicycle frame and includes a derailleur hanger system that will position differing makes of derailleurs in their optimum location with respect to the axle of the rear wheel and which may be easily replaced in the event of an accident.

The dropout assembly generally comprises a vertical dropout member and a hanger member. Disposed within the dropout member is a vertically oriented slot for receiving the axle of the rear wheel of the bicycle. The slot includes a screw-adjusting stop associated therewith which allows the rider/user to set the axle in the exact location necessary to maintain a co-planar orientation between the rear wheel and frame for the proper handling and braking of the bicycle. The dropout member further includes two attachment tabs used to attach the dropout assembly to the seat stay and chain stay members of the bicycle frame. Importantly, the seat stay attachment tab lies on a plane laterally offset from the plane on which the chain stay attachment member is disposed. In this respect, a greater distance is defined between the seat stay tab and rear wheel than as between the chain stay tab and rear wheel. This increased distance provides an improved clearance between the frame and the bicycle chain. The attachment tabs are also adapted to allow the dropout member to be easily and quickly replaced if damaged.

In multi-speed bicycles, the hanger member is used to attach the rear derailleur of the bicycle to the dropout member. Disposed within the hanger member is an aperture which is adapted to receive the derailleur. In the preferred embodiment of the present invention, the hanger member is made of a sacrificial plastic material. In this regard, in instances where the derailleur is inadvertently entangled with an object or caught in the spokes of the bicycle when the bicycle is in motion, the plastic hanger is designed to structurally fail before damage can occur to either the derailleur or remainder of the dropout. Importantly, the hanger member is connected to the dropout member by a fastener which is adapted to allow the hanger member to be easily removed and replaced. Thus, after the sacrificial plastic hanger member breaks away in an accident situation, the rider simply unbolts the remaining pieces, bolts in a new hanger member, reinstates the derailleur and rides away. As previously specified, the dropout member is also adapted to be easily and quickly replaceable if damaged independently of or in addition to the hanger member. A wide variety of different hanger members, each having a different dimensional configuration, may be used in conjunction with the dropout member. In this regard, each hanger member is adapted to be used with the derailleur of a particular manufacturer and will position the derailleur relative to the axle of the rear wheel as per the manufacturer's specifications.

It is an object of the present invention to provide a vertical dropout assembly which is light-weight and may be easily replaced when damaged.

Another object of the present invention to provide a vertical dropout assembly including an interchangeable sacrificial derailleur hanger member which is specifically adapted to break away before damage can be caused to the derailleur or remaining portion of the vertical dropout.

A further object of the present invention is to provide a vertical dropout assembly including a screw-adjusting stop which allows the rider to set the axle of the rear wheel in the exact location necessary to maintain a co-planar existence between the rear wheel and the frame of the bicycle.

A still further object of the present invention is to provide a vertical dropout assembly wherein a number of differently dimensioned hanger members may be utilized in conjunction with the assembly, each hanger member being adapted to be used with a derailleur of a particular manufacturer so as to position the derailleur relative to the axle of the rear wheel as per the manufacturer's specifications.

A still further object of the present invention is to provide a vertical dropout assembly adapted to provide improved clearance between the frame and chain.

Further objects and advantages of the present invention will become apparent to those skilled in the art upon reading and consideration of the following description of a preferred embodiment and the accompanying drawings.

BRIEF DESCRIPTION OF THE DRAWINGS

These as well as other features of the present invention will become apparent upon reference to the drawings wherein:

FIG. 1 is a perspective view of the dropout assembly of the present invention illustrating the engagement thereof to the frame of a bicycle and further illustrating portions of the sprocket cluster, rear derailleur, and rear wheel axle of the bicycle;

FIG. 2 is a perspective view illustrating the engagement of the hanger member to the vertical dropout member of the dropout assembly, and further illustrating the interface of the dropout member to the bicycle frame;

FIG. 3 is an exploded view illustrating the hanger member, dropout member, and fastener used to connect the hanger member, to the dropout member;

FIG. 4 is a front elevational view of the dropout member of the dropout assembly; and FIG. 5 is a top view of one attachment tab of the dropout member taken along line 5—5 of FIG. 4.

DETAILED DESCRIPTION OF THE PREFERRED EMBODIMENT

Referring now to the drawings wherein the showings are for purposes of illustrating a preferred embodiment of the present invention only and not for the purposes of limiting the same, FIG. 1 perspectively illustrates the engagement of the dropout assembly 10 of the present invention to the various frame components of a bicycle. As can be seen in FIGS. 1 and 2, dropout assembly 10 is connected to the seat stay member 12 and chain stay member 14 of the bicycle frame.

Although not by way of limitation, in the preferred embodiment of the present invention, dropout assembly 10 is specifically adapted for use on multi-speed bicycles and comprises a dropout member 16 and a hanger member 18. To facilitate the engagement of dropout assembly 10 to a bicycle frame, dropout member 16 includes a first attachment portion or tab 20 and a second attachment tab 22. In this regard, first attachment tab 20 is sized and configured to be frictionally received within seat stay member 12, while second attachment tab 22 is sized and configured to be frictionally received within chain stay member 14. Importantly, attachment tabs 20, 22 are adapted to allow dropout member 16 to be quickly and easily disengaged from seat stay member 12 and chain stay member 14 thereby facilitating a rapid replacement process in the event dropout member 16 is damaged. Also, as best seen in FIGS. 2 and 5, first attachment tab 20 is interfaced to dropout member 16 through the utilization of an angled portion 24. Thus, attachment tab 20 lies on a plane laterally offset from the plane on which attachment tab 22 is disposed. In this regard, a greater distance is defined between attachment tab 20 and the rear wheel than as between attachment tab 22 and the rear wheel. This increased distance provides an improved clearance between the bicycle frame and chain as best seen in FIG. 1.

Disposed within dropout member 16 is a vertically oriented, elongate slot 26 defining an open end and a downwardly facing closed end therein. Importantly, slot 26 is sized and configured to receive the rear axle 28 of a bicycle wheel in the orientation as best seen in FIG. 1. A major function and advantage of providing slot 26 in a vertical orientation, as opposed to a horizontal orientation as widely used in the prior art, is the "self-centering" of axle 28 within the frame of the bicycle achieved through the limitation of the movement of axle 28 in either a horizontal or vertical plane. As best seen in FIG. 4, disposed within the closed end of slot 26 is a screw-adjusting stop 30. Importantly, stop 30 is operative to allow a rider to set rear axle 28 in the exact location necessary to maintain a co-planar existence between the rear wheel and frame necessary for the proper handling and braking of the bicycle. Dropout member 16 further includes a recessed portion 32 which is formed in the inner surface 16a thereof. Recessed portion 32 defines a generally planar surface 34, one end of which terminates into a generally arcuate surface 36. Disposed within planar surface 34 is an aperture 38 which extends to outer surface 16b of dropout member 16. The end of aperture 38 terminating at outer surface 16b of dropout member 16 includes a chamfer 52 which is sized to maintain the head of a fastener 46 therein in a flush orientation. Dropout member 16 is preferably formed from a lightweight metal, polymer or composite material, although it will be appreciated that a wide variety of other materials may be utilized.

Referring now to FIG. 3, hanger member 18 includes an upwardly extending projection 40 formed as an integral portion thereof, wherein the outer edge of projection 40 has a generally curvilinear configuration. Disposed within projection 40 is an aperture 42 which extends therethrough. Importantly, projection 40 is sized and configured to be received within recessed portion 32 of dropout member 16. In this respect, as best seen in FIG. 2, when projection 40 is received into recessed portion 32, inner surface 44 of projection 42 is abutted against planar surface 34 such that aperture 38 is axially aligned with aperture 42. Such axial alignment is facilitated by the abutment of the curvilinear outer edge of projection 40 against arcuate surface 36 of recessed portion 32. Fastener 46 is received within aperture 38 and aperture 42 thereby connecting hanger member 18 to dropout member 16. The remaining portion of hanger member 18 includes a second aperture 48 extending therethrough which is adapted to receive the rear derailleur 50 of the bicycle. Importantly, in the preferred embodiment of the present invention, hanger member 18 is constructed of a material having less structural strength than the dropout member 16 and/or derailleur 50 such as a polymer plastic material, although it will be appreciated that a wide variety of different materials may be utilized in the manufacture thereof. In this regard, in instances where rear derailleur 50 is inadvertently entangled with an object or caught in the spokes of the bicycle when the bicycle is in motion, hanger member 18 is designed to be sacrificial, i.e. structurally fail before damage can occur to either dropout member 16 or derailleur 50. Furthermore, fastener 46 is adapted to allow hanger member 18 to be quickly and easily removed from dropout member 16 and replaced. Thus, after hanger member 18 breaks away in an accident situation, a new hanger may be inserted in its place with a minimal amount of difficulty.

In the preferred embodiment of the present invention, dropout member 16 may also be utilized with any one of a wide variety of differently dimensioned hanger members, each having a different dimensional configuration. Though the basic configuration of such hanger members will be identical to that as previously described with respect to the preferred embodiment, each hanger member will be dimensioned so as to position the derailleur of a specific manufacturer relative to the axle of the rear wheel as per the manufacturer's specifications. Importantly, projection 40 of each of the differently dimensioned hanger members will be sized so as to be receivable into recessed portion 32 of dropout member 16.

Additional modifications and improvements of the invention may also be apparent to those skilled in the art, thus, the particular combination of parts described and illustrated herein is intended to represent only one embodiment of the invention, and it is not intended to serve as limitations or alternative devices within the spirit and scope of the invention.

What is claimed is:

1. A vertical dropout assembly for attachment to a bicycle frame comprising:
   a vertical dropout member, said vertical dropout member defining an elongate, vertically oriented slot therein for receiving an axle of a bicycle wheel;
   a hanger member adapted to receive a rear derailleur of a bicycle;
   means for connecting said hanger member to said dropout member; and
   means for frictionally attaching said dropout member to a seat stay and chair stay of said bicycle frame, said attaching means comprising a first tab member formed on said dropout member sized and configured to be frictionally received and secured within said seat stay and a second tab member formed on said dropout member sized and configured to be frictionally received and secured within said chain stay, said first tab member being formed on said dropout member in a manner so as to be laterally offset from said second tab member such that the distance separating said first tab member and said wheel is greater than the distance separating said second tab member and said wheel when said dropout assembly is attached to said bicycle frame, said first and second tab members being adapted to allow said dropout member to be quickly and easily removed from said bicycle frame.

2. A dropout assembly for attachment to a bicycle frame comprising:
   a dropout member defining a slot therein for receiving an axle of a bicycle wheel;
   a hanger member adapted to receive a rear derailleur of a bicycle;
   means for connecting said hanger member to said dropout member; and
   means for frictionally attaching said dropout member to said bicycle frame, said attaching means comprising a first tab member formed on said dropout member and a second tab member formed on said dropout member, said first tab member being formed on said dropout member so as to be laterally offset from said second tab member such that the distance separating said first tab member and said wheel is greater than the distance separating said second tab member and said wheel.

3. A dropout assembly for attachment to a bicycle frame comprising;
   a dropout member defining a slot therein for receiving an axle of a bicycle wheel;
   a hanger member adapted to receive a rear derailleur of a bicycle;
   means for connecting said hanger member to said dropout member; and
   means for frictionally attaching said dropout member to said bicycle frame, said attaching means comprising first and second tab members formed on said dropout member, said first and second tab members being sized and configured to be frictionally received and secured within said bicycle frame.

4. The device as defined in claim 3 wherein said hanger member is constructed from a plastic material.

5. The device as defined in claim 3 wherein said dropout member further includes means for maintaining proper alignment between said axle and said bicycle frame.

6. The device as defined in claim 5 wherein said alignment means comprises a screw-adjusting stop disposed within said slot.

7. The device as defined in claim 3 wherein said dropout member includes a recessed portion therein sized and configured to receive said hanger member and said connecting means comprises a fastener member adapted to allow said hanger member to be easily removed from said dropout member.

8. The device as defined in claim 7 wherein said recessed portion is adapted to allow said hanger member to be replaced by one of a plurality of differently dimensioned hanger members, each of said hanger members being sized and configured to be used with a derailleur from a particular manufacturer and position said derailleur relative to said axle per the manufacturer's specifications.

* * * * *